(12) United States Patent
Jansen

(10) Patent No.: US 7,549,902 B2
(45) Date of Patent: Jun. 23, 2009

(54) ELECTRIC MOTOR ASSISTED PROPULSION SYSTEM FOR HUMAN-POWERED WATERCRAFT

(76) Inventor: Patrick Lee Jansen, 1539 Washout Rd., Scotia, NY (US) 12302

( * ) Notice: Subject to any disclaimer, the term of this patent is extended or adjusted under 35 U.S.C. 154(b) by 17 days.

(21) Appl. No.: 11/933,590

(22) Filed: Nov. 1, 2007

(65) Prior Publication Data

US 2008/0132127 A1 Jun. 5, 2008

Related U.S. Application Data

(60) Provisional application No. 60/864,005, filed on Nov. 2, 2006.

(51) Int. Cl.
| | |
|---|---|
| B63H 16/18 | (2006.01) |
| B63H 16/20 | (2006.01) |
| B63H 21/17 | (2006.01) |
| B63H 21/20 | (2006.01) |
| B63H 23/10 | (2006.01) |
| B63H 23/12 | (2006.01) |

(52) U.S. Cl. .................... 440/27; 440/3; 440/6; 440/30
(58) Field of Classification Search .................... 440/3, 440/6, 13–32; 180/65.2, 205–207; 280/212–217
See application file for complete search history.

(56) References Cited

U.S. PATENT DOCUMENTS

| | | |
|---|---|---|
| 5,088,944 A | 2/1992 | Kats |
| 5,362,264 A | 11/1994 | Parant |
| 5,672,080 A | 9/1997 | Gauthier |
| 6,065,414 A | 5/2000 | Hulbig |
| 6,217,398 B1 | 4/2001 | Davis |
| 6,712,653 B2 * | 3/2004 | Free ........................... 440/30 |
| 6,855,016 B1 | 2/2005 | Jansen |
| 6,986,688 B1 | 1/2006 | Jansen |
| 7,021,978 B2 | 4/2006 | Jansen |

FOREIGN PATENT DOCUMENTS

| | | | |
|---|---|---|---|
| DE | 10138662 A1 | * | 2/2003 |
| JP | 07304494 A | * | 11/1995 |
| JP | 09207886 A | * | 8/1997 |

* cited by examiner

Primary Examiner—Ajay Vasudeva

(57) ABSTRACT

A propulsion system for watercraft for personal enjoyment that incorporates human power with electric motor assistance, energy storage and optional solar power to achieve increased watercraft speeds and/or reduced pedaling effort. Control electronics enable operator-adjustable electric motor assistance to the propulsion, thereby providing flexible pedal cadences and efforts and enjoyment for a wide variety of operators. An optional photovoltaic solar panel augments the power generation to extend travel time with motor assistance, and recharges the energy storage system. This invention enables a pleasure watercraft that is simultaneously lightweight, low cost, low maintenance, environmentally friendly with zero pollution, ultra-low noise, and thrilling to operate, while simultaneously providing a means of enjoyable exercise for operators of nearly all abilities.

16 Claims, 15 Drawing Sheets

$K_0 = 40.5\ Nm/kRPM^2$, $K_1 = 0.0741\ MPH/Nm$

ELECTRIC MOTOR ASSISTED PROPULSION SYSTEM FOR HUMAN-POWERED WATERCRAFT

CROSS-REFERENCE TO RELATED APPLICATION

This application claims the benefit of Provisional Patent Application Ser. No. 60/864,005 filed Nov. 2, 2006, "Human-Powered Watercraft with Electric Motor Assisted Propulsion".

FEDERALLY SPONSORED RESEARCH

Not Applicable

SEQUENCE LISTING OR PROGRAM

Not Applicable

BACKGROUND

1. Field of Invention

The present invention relates to the general art of watercraft, and to the particular field of hybrid-electric powered propulsion systems for watercraft incorporating manual (i.e., human pedal) power with electric motor power assistance with energy storage in the form of electric battery, capacitor, fuel cell, and/or flywheel energy storage, and/or solar power.

2. Description of Prior Art

A multitude of pedal-powered watercraft (also referred to as water bikes, water-bicycles, and watercycles) are commercially available. They are relatively low cost, low maintenance, light weight, and fun. Their main drawback is the relatively low power output capability of the operators. Unlike watercraft propelled by conventional combustion engines, pedal-powered watercraft are severely limited in power capability; typically less than 200 watts (around ¼ hp) per person on a continuous basis. A cyclist in good condition can generate around 200-250 watts at a preferred cadence of around 90-100 RPM. Many people of lesser abilities may be only capable of generating around 100 watts in a continuous comfortable manner. Thus maximizing the overall efficiency of the watercraft, including its propulsion system, as it travels in water is vitally important to maximize speed and travel distance capabilities. To maximize the speed (and pedaling efficiency), many of the newer watercycles such as the Seacycle® and Waterbike® manufactured by the Meyers Boat Company, Inc. and the Surfbike are designed to be lightweight with efficient long and narrow hulls.

OBJECTS AND ADVANTAGES

The object of the invention is to provide a propulsion system enabling a pleasure watercraft that is lightweight, low cost, environmentally friendly with zero pollution, ultra-low noise, and thrilling to operate, while simultaneously providing an optional means of enjoyable exercise for operators of all abilities. A person that routinely pedals a conventional watercycle on a specific lake or river is likely to see only the same limited area each time, due to the severely restricted speed, and hence, travel distance possible within a finite amount of exercise time. This can lead to boredom rapidly. Thus one objective of the present invention is to enable a new type of watercycle employing an electric motor assistance means with energy storage and/or solar power to substantially increase the speed and range of the watercraft.

With proper hull design and sufficient electric motor assistance, this invention may also enable the watercraft to achieving hull planing speeds, that would normally not be possible under human-power only.

This invention combines human-power and electric-power watercraft propulsion technologies into one watercraft, and by adding new innovative controls, the best of both types of watercraft is obtained. With this invention, the fit cyclist that routinely exercises, as well as the occasional rider or tourist, can explore a much larger area of a bay, lake or river, in a shorter amount of time, thereby increasing enjoyment considerably. Unlike battery-only electric watercraft, this invention removes the worry of running out of battery power, or solar power on a cloudy day or night. If the batteries become drained, and solar power is not available, the operator can still pedal back to shore, though at reduced power. Diagnostic displays that monitor the usable stored energy of the battery, as well as the generated solar power and pedal power, keep the operator informed, so that the operator can wisely return to shore under full power, if desired, prior to battery depletion.

It is another objective of the present invention to provide a propulsion system for watercraft comprising electric motor assistance, thereby permitting operators of differing physical abilities and goals to simultaneously operate one or more of the watercraft over the same distance at the same speed, thereby sharing the experience, while still exercising at their individually preferred effort levels.

It is another objective of the present invention to provide a propulsion system for dual-seated watercraft comprising dual systems of electric motor assistance, thereby permitting operators of differing physical abilities and goals to simultaneously operate the same watercraft while each independently achieving their desired level of physical exercise.

It is still another objective of the present invention to provide a propulsion system for watercraft comprising operator-selectable pedal torque vs. pedal cadence characteristics, such as simulated rolling hills to add an additional degree of enjoyment and pedaling comfort to the operator. Such flexibility is not possible with pure mechanically-driven systems, such as prior art waterbikes.

Yet another objective of the present invention is to provide a propulsion system for watercraft employing an electric motor assistance means via energy storage with photovoltaic power to recharge the energy storage, thereby providing an environmentally-friendly watercraft.

Yet another objective of the present invention is to provide a propulsion system for watercraft employing an electric motor assistance means via energy storage with photovoltaic power to enable increased travel speed and range when the energy storage system is depleted.

Yet another objective of the present invention is to provide a propulsion system for hybrid-electric watercraft with mechanical linkage connecting the pedal mechanism to the propeller such that the watercraft can still be propelled under human power in the event of a failure of an electric or electronic component.

SUMMARY

A propulsion system for watercraft comprising a mechanism that accepts human effort, a propulsion means comprising at least one propeller for converting torque to propelling thrust, a mechanical drive means that transfers the said human effort to torque at the said propeller, at least one electric motor configured to provide additional torque to the said propeller, an energy storage means configured to supply electrical power to the said electric motor, a control means to control the electrical power supplied to the said electric motor as a function of the human effort, and a housing means that at least partially connects at least the electric motor and mechanical drive means.

DRAWINGS

Drawing Figures

FIG. 1 illustrates a typical human pedal-powered watercraft of the prior art (U.S. Pat. No. 5,672,080).

FIG. 2 illustrates the propulsion system unit of the human-powered watercraft of the prior art with chain and sprocket drive mechanisms (U.S. Pat. No. 5,672,080).

FIG. 3 illustrates the propulsion system of the prior art (U.S. Pat. No. 5,672,080) enhanced with the preferred embodiment incorporating electric motor assistance.

FIG. 4 illustrates the watercycle of the prior art (U.S. Pat. No. 5,672,080) enhanced with the propulsion system incorporating electric motor assistance.

FIG. 5 illustrates the power and control system functional block diagram.

FIGS. 6A and B illustrate exemplary propeller and watercraft characteristics.

Figure 12:
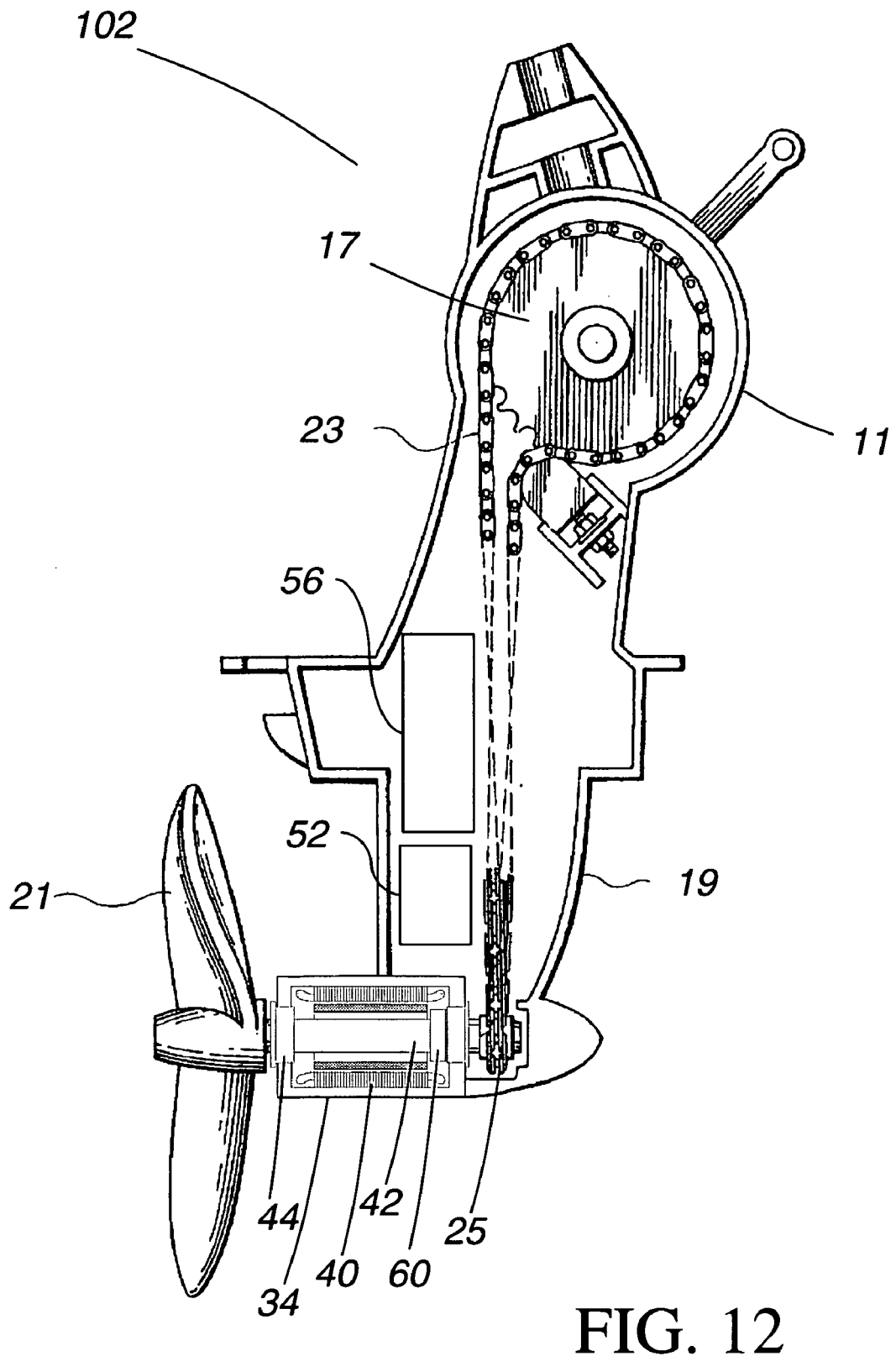

FIG. 12 illustrates the propulsion system of the prior art (U.S. Pat. No. 5,672,080) enhanced with an alternative embodiment that incorporates electric motor assistance with torque sensor feedback.

Figure 13:
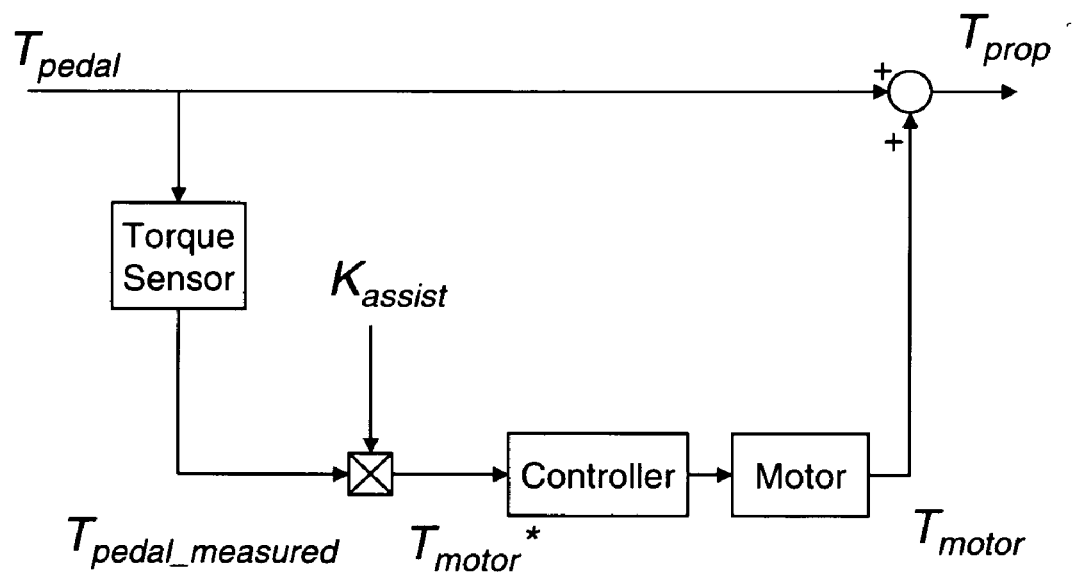

FIG. 13 illustrates the basic control block diagram for an alternative embodiment utilizing a torque sensor.

Figure 14:
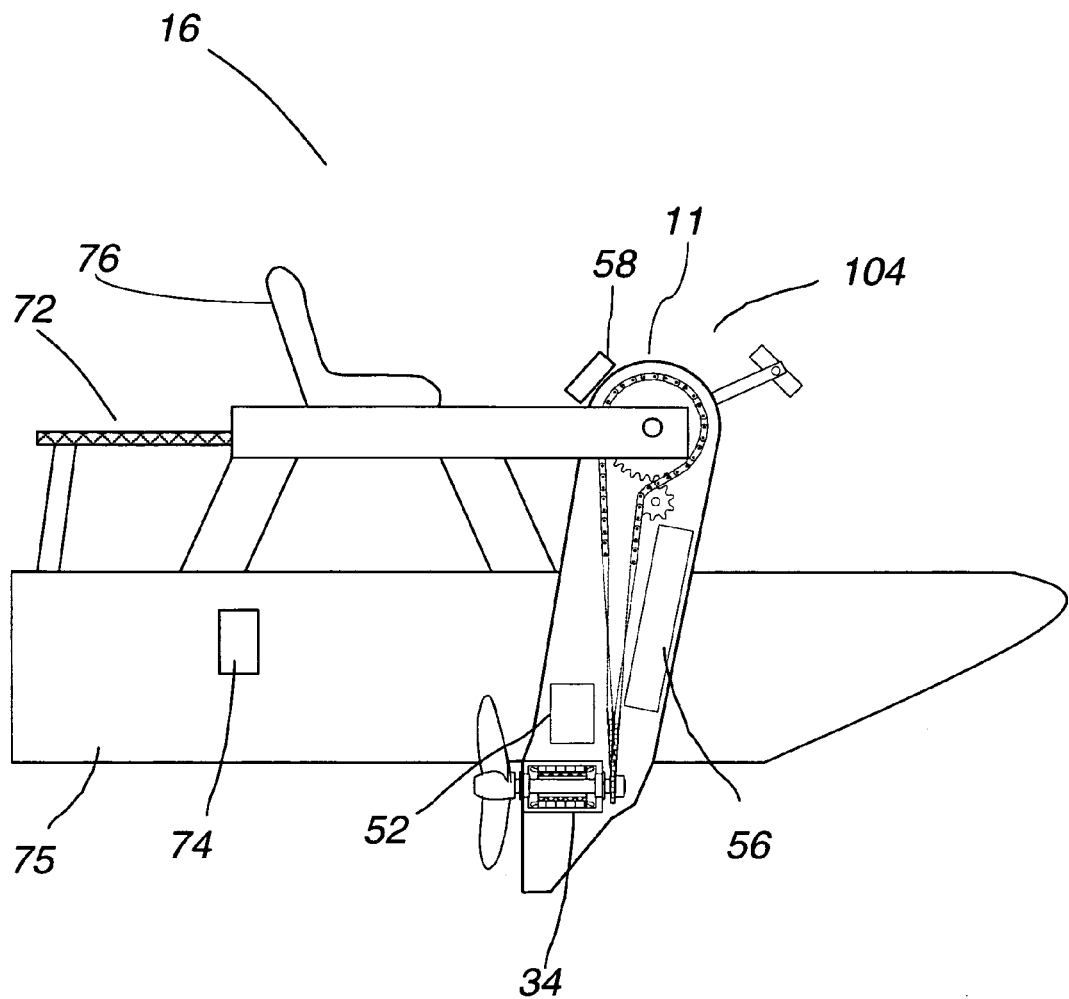

FIG. 14 illustrates a watercycle incorporating the invention with operator seating in a recumbent position, and an optional photovoltaic system.

Figure 15:
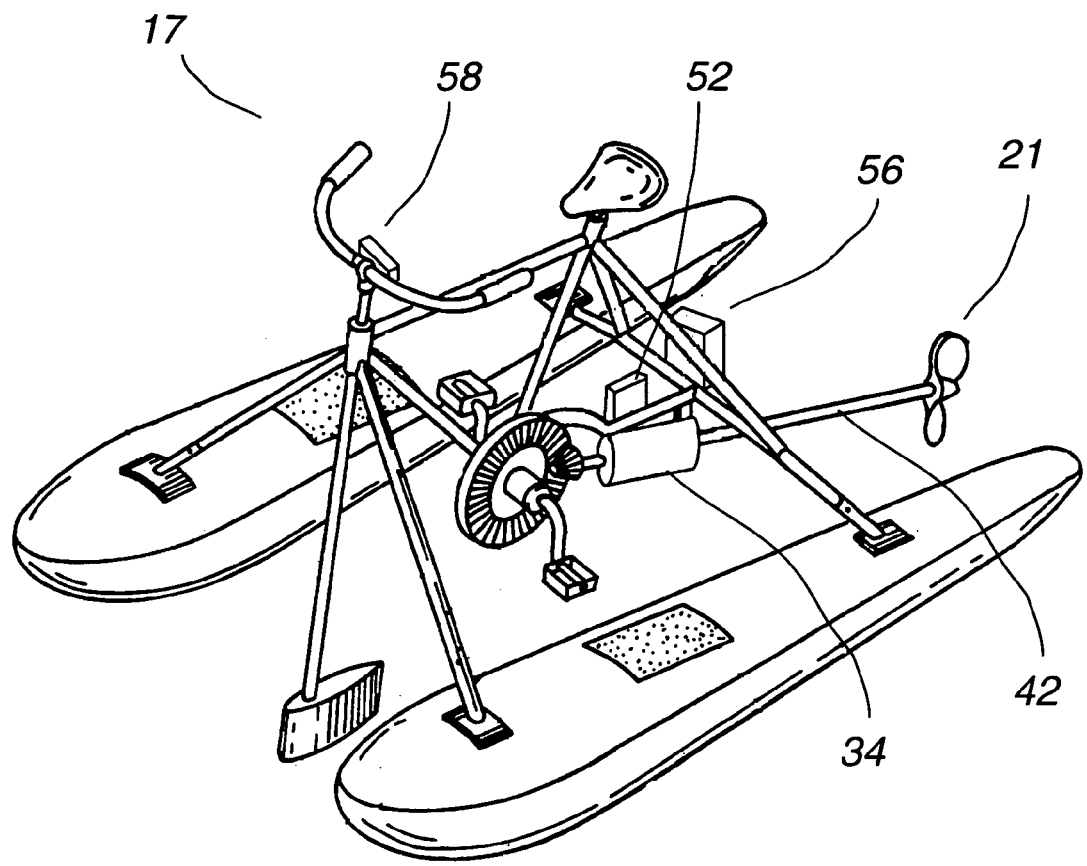

FIG. 15 illustrates a catamaran style watercycle of the prior art (U.S. Pat. No. 5,088,944) containing a propulsion system with a long shaft and bevel gearing enhanced with electric motor assistance.

DETAILED DESCRIPTION

Description and Operation

Figure 1:
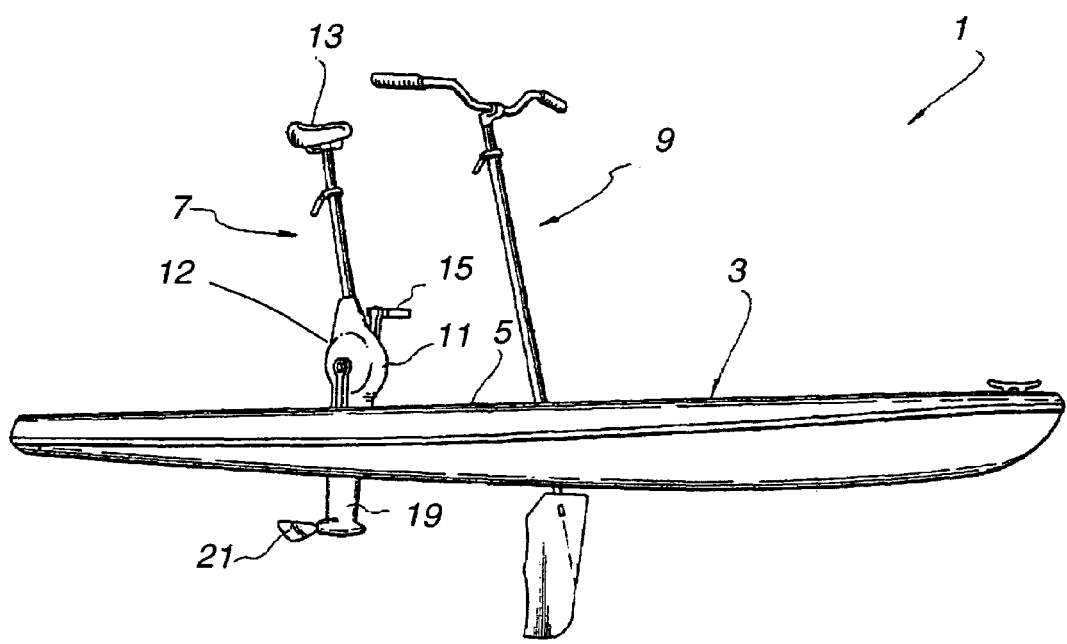

FIG. 1 illustrates a typical human-powered watercycle (water bicycle) 1 of the prior art (U.S. Pat. No. 5,672,080). The watercycle 1 has an elongated floatation board 3, a propulsion and seat unit 7, and a steering unit 9. The propulsion and seat unit 7 consists of an operator seat 13 and propulsion unit 12. The propulsion unit 12 consists of an upper body 11 and lower body 19, pedal mechanism 15, and propeller 21. An operator pedals the crank pedal mechanism 15, which turn the propeller 21, thereby propelling the watercraft forward.

Figure 2:
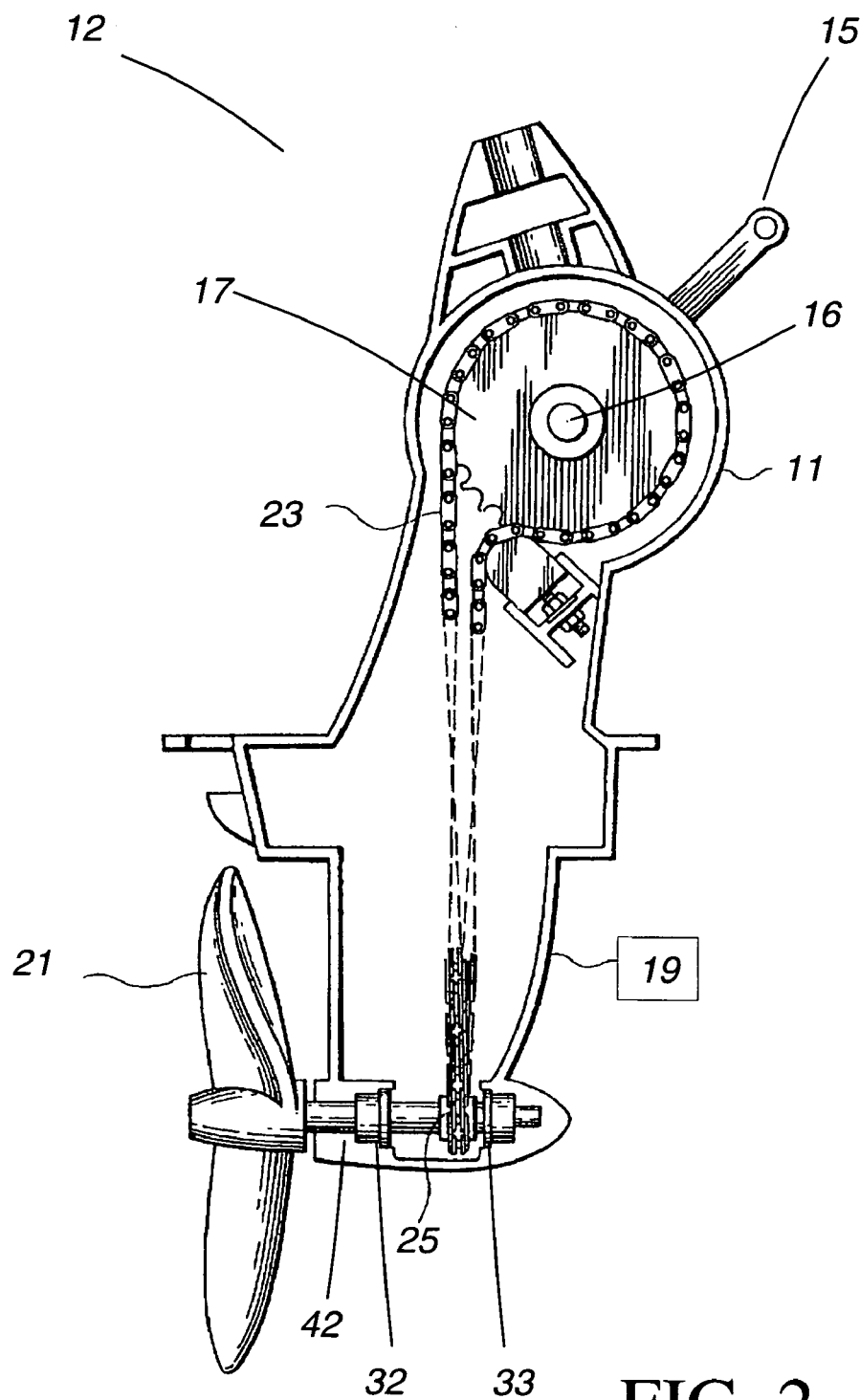

FIG. 2 illustrates the propulsion system unit 12 of the human-powered watercycle (water bike) 1 of the prior art in FIG. 1. A human operator pedals a crank pedal mechanism 15, thereby causing a crankshaft 16 to rotate in equivalent manner as pedaling the crank mechanism of a bicycle. The crankshaft contains a crankshaft sprocket 17. A propeller 21 is mounted on a rotating propeller shaft 42 that also contains a propeller shaft sprocket 25. The crankshaft sprocket 17 and the propeller shaft sprocket 25 are linked by a chain 23, which transmits the pedaling motion power from the crankshaft 16 to the propeller shaft 42 and propeller 21, and causing the propeller to rotate, produce thrust, and propel the watercycle. The direction of thrust and resulting watercycle motion is controlled simply the direction of the pedaling action by the operator.

The relative sizes of the crankshaft sprocket 17 and propeller shaft sprocket 25 dictate an effective "gear" ratio for the pedaling action. Typical gear ratios range from 1:5 to 1:10 (with propeller rotational speed increased relative to pedal cadence), and are chosen dependent upon the size and pitch of the propeller, and in some cases, the customization of the propulsion system for specific operators. The propulsion system in FIG. 2 is single-speed, i.e., no gear ratio (sprocket) changing, unlike multiple speed bikes. This is the most common configuration, although multi-speed system are available, however, pedaling in reverse direction is generally not possible.

The propulsion unit housing 19 is usually molded or cast from a polymer such as nylon, HDPE, or urethane. The propeller 21 is usually molded or cast from a polymer such as nylon or urethane. The propeller shaft 42 is usually fabricated from stainless steel. The chain 23 and sprockets 17 and 25 are usually steel, with a heavy weight oil or grease applied for lubrication and corrosion protection.

Figure 3:
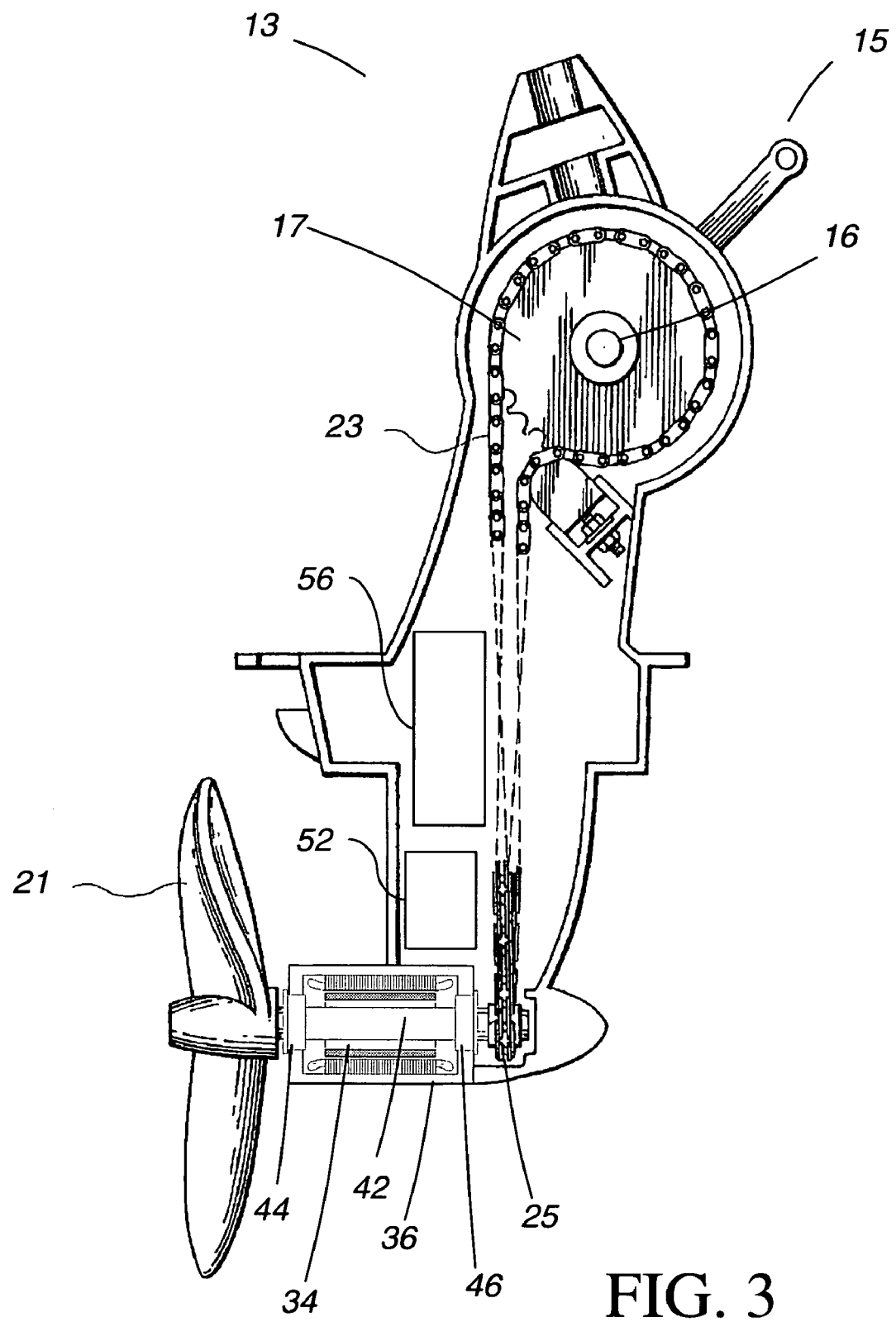

FIG. 3 illustrates the preferred embodiment of a propulsion system unit 13 for a watercycle that incorporates the electric motor assistance, which is the essence of this invention. An electric motor 34 is mounted integral with the propeller shaft 42, such that the propeller 21, electric motor 34, and propeller shaft sprocket 25 all share the same shaft 42. As illustrated, the electric motor 34 is situated between the propeller 21 and the propeller shaft sprocket 25. Bearings (with seals) 44 and 46 support the shaft 42, and combined with motor housing 36 protect and seal the motor 34 from the water environment. An electronic control unit 52 is housed within the propulsion unit 13. The electronic control unit 52 provides controlled power to the electric motor from an energy storage unit 56, as well as connects to an operator-interface (58 in FIG. 4). Torque and mechanical power produced by the electric motor 34 can be seen to apply to the propeller 21, in addition to torque and mechanical power produced by the pedaling effort.

Numerous alternative embodiments exist for placement and mechanical linkage of the electric motor relative to the propulsion unit. For example, in an alternative embodiment relative to FIG. 3, the electric motor 34 is situated forward (right in FIG. 3) of the propeller shaft sprocket; i.e, the propeller shaft sprocket is situated between the propeller and the electric motor.

In other embodiments, the electric motor and the propeller do not need to share the same shaft. In general, the electric motor can transmit torque to the propeller shaft via any one of the following means and not limited to: common shafts (as in FIG. 3.), separate but coupled shafts, gears, chain & sprockets, and belts & pulleys. For example, the electric motor 34 can couple to the propeller shaft 42 through an additional sprocket sharing the same chain 23. The electric motor can also be indirectly coupled to the propeller shaft 42 by coupling first to the crankshaft 16 or crankshaft sprocket 17.

The electric motor 34 may be of any type including brushed DC, brushless DC, permanent magnet (PM) AC synchronous, induction, switched reluctance, and synchronous reluctance. The preferred types are brushless DC and PM AC synchronous because they generally provide the highest power density with the highest efficiency. Furthermore, the motors are inherently rugged and relatively simple to construct. Another advantage is that the stator windings can be effectively cooled from the surrounding water by fabricating the motor housing 36 from aluminum or steel. Anodized aluminum is preferred for the motor housing 36 because it is lightweight, corrosion resistant, easy to machine, and has high thermal conductivity. For brushed DC motors, the housing 36 would preferably be made of steel to also carry magnetic flux of the motor field.

The design ratings for the electric motor are dependent upon the level of performance desired for the specific product and gear ratio. A typical embodiment rating would be in the range of 250 to 1000 Watts, at a rated speed in the range of 400 to 1500 RPM assuming direct coupling or a common shaft between the propeller 21 and the electric motor rotor 34. A higher motor rating enables higher watercraft speeds with the appropriate propeller and gear ratio. With a 1:6 gear ratio, the rated (top) speed of the motor would be around 600 RPM at a rated pedal cadence of 100 RPM. The propeller would be selected (based upon conventional propeller selection guidelines) to operate efficiently at speeds up to and including 600 RPM and sized for the combined motor and pedal power rating.

The energy storage unit 56 can be located within or attached to the propulsion unit 13 as illustrated in FIG. 3 to provide a compact and portable propulsion system with minimal electrical wiring, connectors, and individual components as seen by the operator. Alternatively, the energy storage unit 56 can be located separate from the propulsion unit, but within or attached to watercraft hull or structure. This configuration generally enables a larger amount of energy storage.

Figure 4:
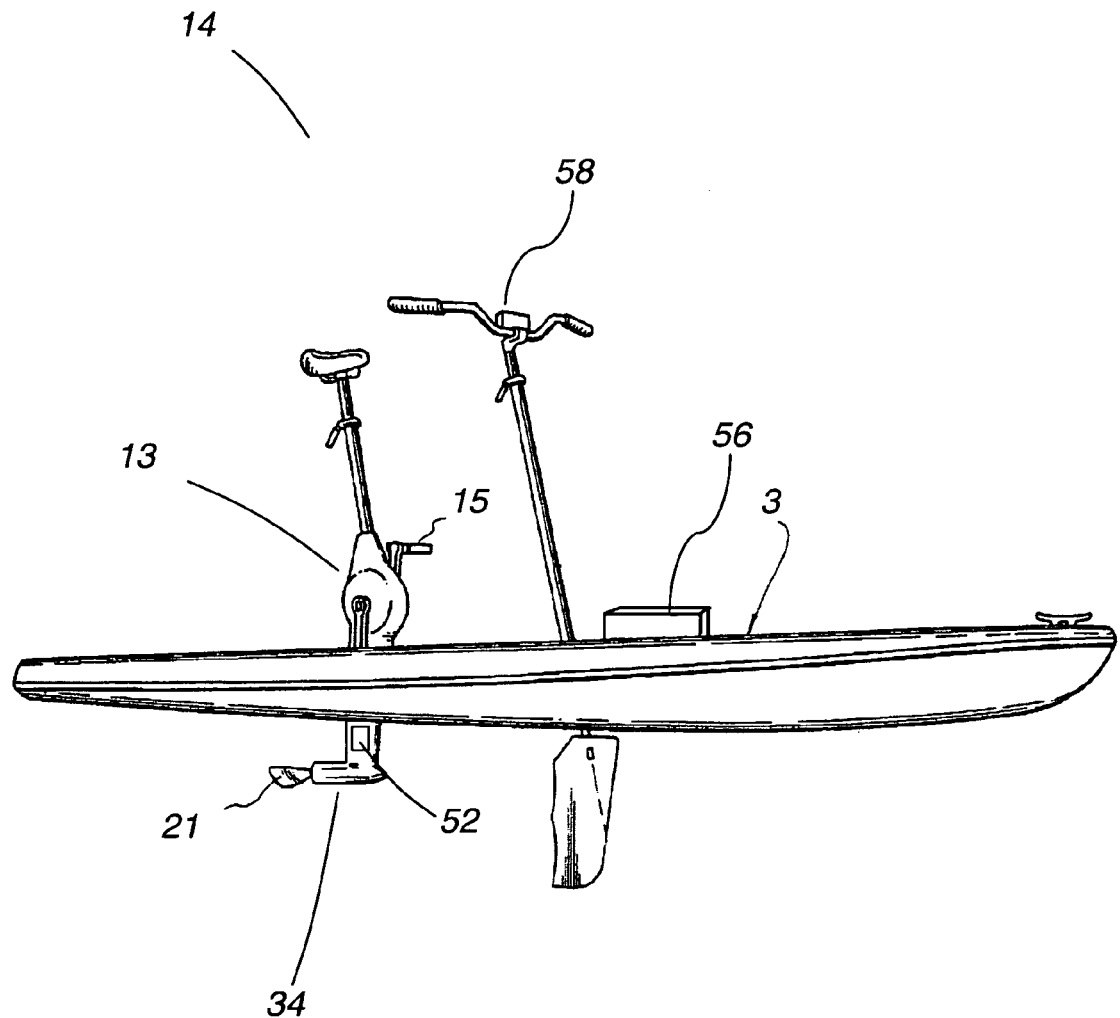

FIG. 4 illustrates a watercraft 14 of the prior art (from FIG. 1) modified to incorporate this invention. The watercraft is fitted with the motor-assisted propulsion unit 13 and an operator control unit 58, all interconnected via the appropriate power and control wiring (not shown). The energy storage unit 56 is shown to be optionally located attached to the hull 3, separate from the propulsion unit 13.

The energy storage unit 56 is preferably a battery such as lead-acid, NiCad, or NiMH. As battery technology improves and costs reduce and safety improves, new battery technologies such as large-format Li-Ion or NaNiCl may become cost effective and safe. Alternative energy storage means such as fuel-cells, ultra-capacitors, and flywheels may also become cost effective and preferable in the future. The preferred rated voltage for the energy storage unit 56 is 24V DC, although 12V, 36V, 42V, and 48V DC may also be suitable commonly used voltage levels, or any value in the general range of 6-50V.

The amount of stored energy is preferably at least sufficient to allow operation with maximum motor assistance for 1-2 hours. The amount of energy storage required is therefore dependent upon the maximum ratings of the electric motor 34. For example, if the motor is rated at 250 Watts, then at least 250-500 Watt-hours of available energy storage capacity is required. Likewise, if the motor is rated at 1000 Watts, then at least 1000-2000 Watt-hours of available capacity is required.

Figure 5:
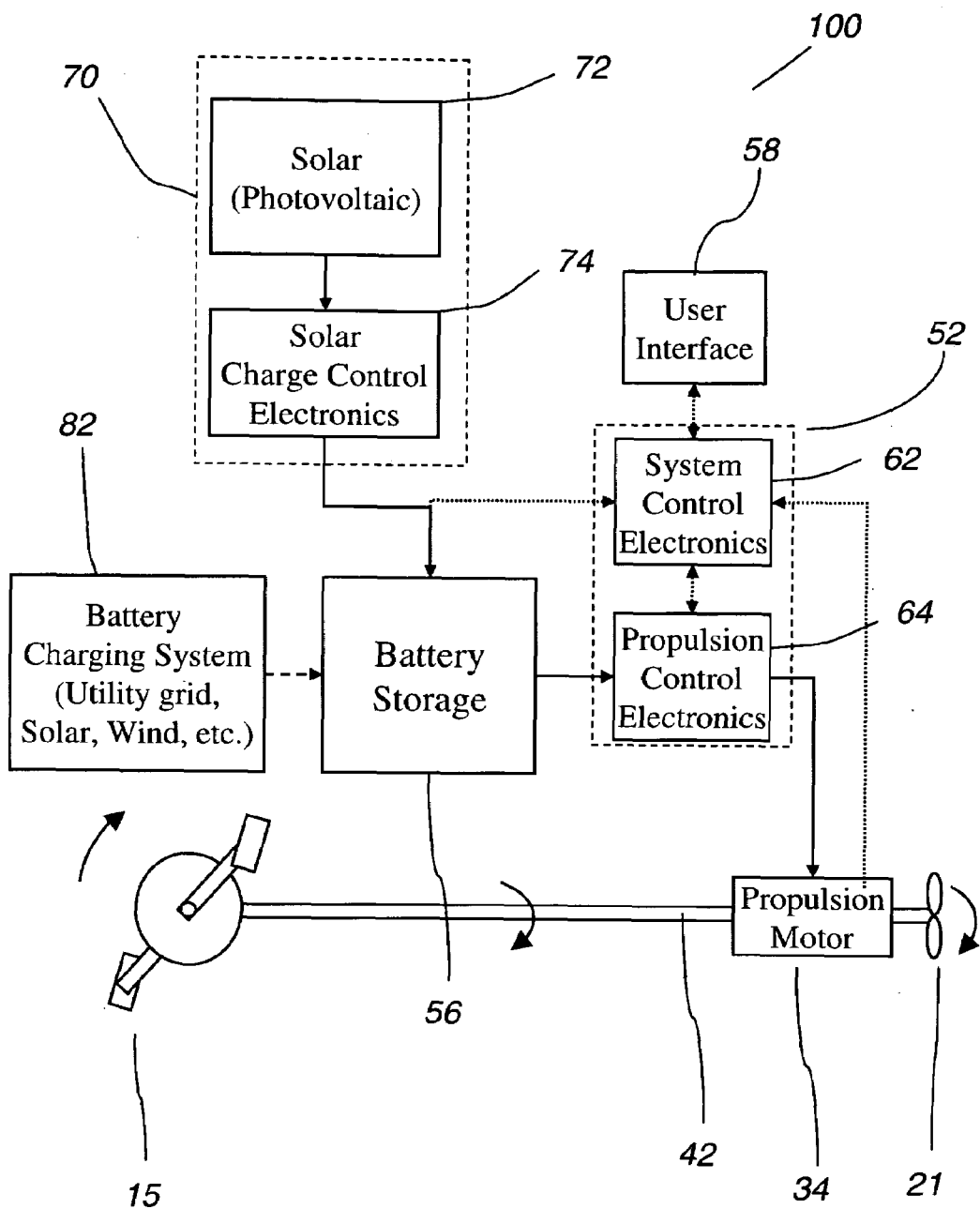

FIG. 5 illustrates the power and control system functional block diagram 100 of the invention. The electric (propulsion) motor 34, propeller 21, and pedal/crank mechanism 15 are illustrated to functionally share the same power transmission shaft 42, although, as discussed above, the actual shafts may differ according to the implemented means of mechanical transmission (direct, gearing, chain, belt, etc.).

Electronic control unit 52 includes a system control electronics unit 62 and a propulsion control electronics unit 64. The systems control electronics unit 62 preferably contains a microcontroller, such as the Zilog ZNEO Z16F, or a DSP, such as the TMS320C24x. The systems control electronics unit 62 interfaces/monitors a user (operator) interface unit 58. The systems control electronics unit 62 also monitors the status of the electric motor 34 and generates and sends the electric motor control commands to the propulsion control electronics unit 64.

The propulsion control electronics 64 consists preferably of a power electronic switching converter consistent with the type and ratings of the electric motor 34; e.g., for a 3-phase brushless DC or PM AC synchronous motor, the converter would typically be a 3-phase MOSFET PWM voltage-source-inverter. If the motor 34 is a brushed DC motor, then the converter would typically be either a DC chopper circuit with MOSFET PWM switching and reversing contactors, or a full H-bridge circuit, also with MOSFET PWM switching.

In the preferred embodiment, the electronic control unit 52 is simply a 3-phase PWM VSI (voltage source inverter) motor drive with a microcontroller (or DSP) with sufficient processing and I/O, PWM, and A/D ports to generate both the system/motor control commands (e.g., torque and/or power) unique to this invention and the individual PWM gating signals for the motor drive switches, as well as communicate with the user (operator) interface 58.

The two units 62 and 64 are preferably integrated into a single printed circuit board, although they can also be designed to be distinct and physically separated.

The electronics control unit 52 (as shown in FIG. 4) is preferably located below the waterline of the watercraft to provide cooling of the power electronic components in the propulsion control electronics unit 64. The MOSFET switching devices are connected to the inner surface of an aluminum heatsink or cold plate. The outer surface of the heatsink/cold plate is in direct, or at least indirect, contact with the water for good thermal heat transfer from the switching devices to the water. The outer edges of the heatsink/cold plate are sealed against the propulsion unit enclosure 19.

An optional solar electric unit 70, mounted on the watercraft, consisting of one or more solar (photovoltaic) panels 72 and solar charge control electronics unit 74, also shown in FIG. 5. The solar electric unit 70 charges the energy (e.g., battery) storage unit 56, and also can supply power to the propulsion unit when the watercraft is in operation.

An external charging system 82 is used in conjunction with, or as an alternative to, the optional solar electric unit 70 to charge the energy storage unit 56 when the watercraft is not in operation. The external charging system 82 may be of any type compatible within the voltage rating, storage capacity, and energy storage type, including a conventional lead-acid (or NiMH, Li-Ton, etc.) battery charger connected to the utility grid, a photovoltaic charging system, or a wind turbine power charging system. If the energy storage unit 56 is a fuel cell, then recharging consists of replenishing the fuel, e.g., hydrogen, etc.

Proper controls unique to this invention, as are disclosed below, are required to ensure that the torque is acting in a direction and magnitude to aid the pedaling effort in a safe operator-controlled manner. The control functions which are implemented by the electronic control unit 52 are as follows:

In the simplest and preferred embodiment, the speed of the electric motor 34, $\omega_{motor}$, is first sensed or estimated. The speed of the propeller 21, $\omega_{prop}$, is then determined from the motor speed since the coupling ratio is known; in this preferred embodiment in FIG. 3, the motor speed and propeller speed are the same since they share a common shaft; i.e., $\omega_{prop} = \omega_{motor}$. The speed of the electric motor is typically a known or controlled variable in motor drives.

The torque (and/or power) on propeller 21 is then estimated from predetermined characteristics of the known propeller 21. In the preferred embodiment, and for most propellers suitable for this application, the following expression is sufficiently accurate to estimate the propeller torque, $T_{prop}$, based upon the propeller speed, $\omega_{prop}$:

$$T_{prop} \cong K_0 \left( \omega_{prop} - \frac{v_{boat}}{K_1} \right)^2 \qquad 1$$

Figure 6A:
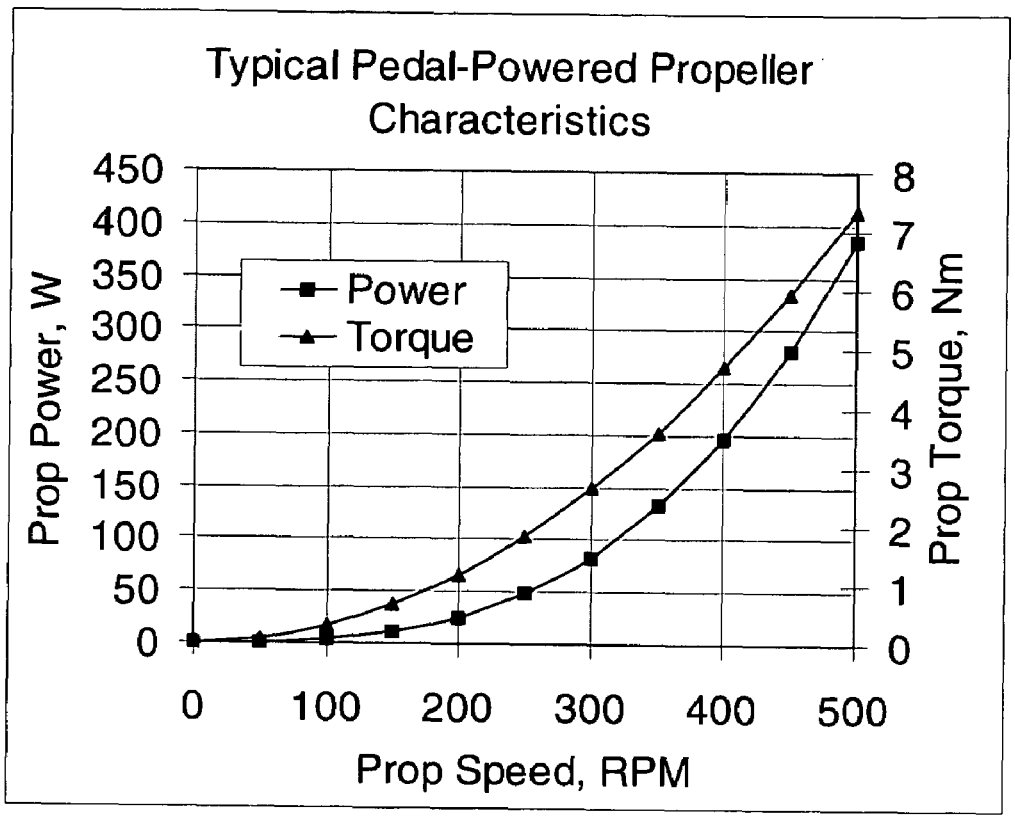

The power developed by the propeller 21 is then:

$$P_{prop} \cong K_0 \left( \omega_{prop} - \frac{v_{boat}}{K_1} \right)^2 \omega_{prop} \qquad 2$$

where $v_{boat}$ is the estimated watercraft speed relative to the surrounding water, $\omega_{prop}$ is the sensed or calculated propeller shaft speed, $T_{prop}$ is the sensed or calculated propeller shaft torque, and $K_1$ and $K_0$ are constants characterizing largely the propeller, but are also dependent to some extent on the watercraft hull design and displacement. The constants $K_1$ and $K_0$ are preferably determined empirically via curve-fitting of measured test data. Additional accuracy can be provided via more elaborate closed-form equations, or via closed-form equations coupled with look-up tables. FIG. 6A illustrates the characteristics of a typical propeller used in this invention.

If the watercraft speed, $v_{boat}$, is not known (e.g., a sensed watercraft speed signal is not available or deemed cost effective), then the propeller torque and power can be approximated simply as $$T_{prop} \cong K_0 \omega_{prop}^2 \qquad 3$$

$$P_{prop} \cong K_0 \omega_{prop}^3 \qquad 4$$

Figure 6B:
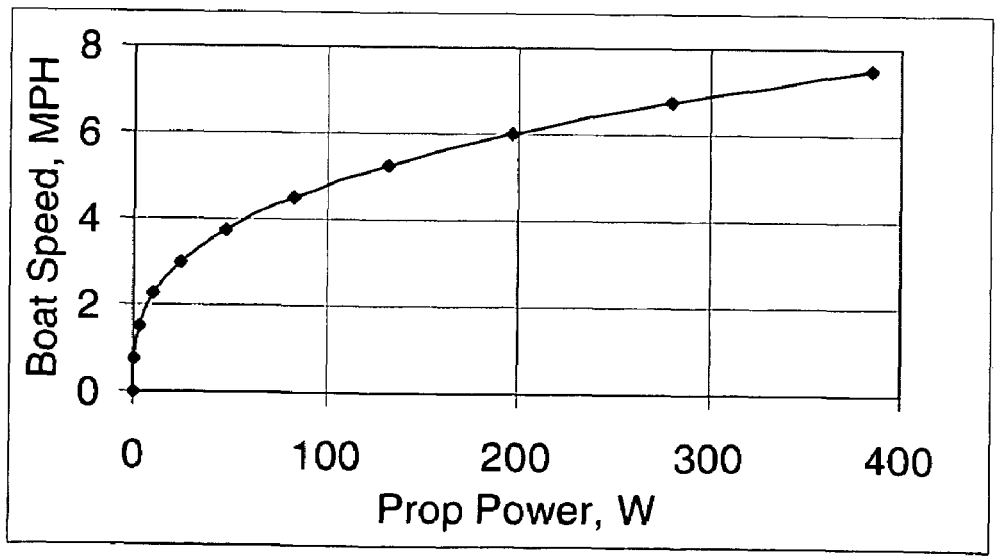

Or alternatively, the watercraft speed, $v_{boat}$, can be mapped as a function of the propeller shaft speed, power or torque for specific watercraft and propeller with a typical load (i.e., operator weight). In which case, e.g., $$v_{boat} \cong f(\omega_{prop}) \qquad 5$$

and equations 1 and 2 above are still used. FIG. 6B illustrates an exemplary mapping of watercraft speed to propeller power. This assumes that the watercraft speed is at a steady state relative to the propeller state.

Equations 1 and 3 (or 2 and 4) provide the required torque (or power) to spin a specific propeller 21 at a specific speed when the propeller is submerged in water. This propeller torque is produced by a combination of human-powered pedaling action and electric motor 34 torque. In accordance with this invention, this combination is set by a user-specified motor assistance level, $K_{assist}$, defined as $$K_{assist} \equiv \frac{T_{motor}}{T_{pedal}} \qquad 6$$

or, equivalently, $$K_{assist} \equiv \frac{P_{motor}}{P_{pedal}} \qquad 7$$

where $T_{motor}$ is the torque produced by the electric motor 34 referred to the propeller shaft 42, and $T_{pedal}$ is the torque produced by the pedaling action of the operator, also referred to the propeller shaft 42. They thus differ from the actual electric motor torque and pedal torque by the effective gear ratios.

The propeller shaft torque is the sum of the effective motor and pedal torques (referred to the same rotating speed if gearing is involved); i.e., $$T_{prop} = T_{motor} + T_{pedal} \qquad 8$$

Equivalently, the propeller power is $$P_{prop} = P_{motor} + P_{pedal} \qquad 9$$

Thus from equations 6 and 8, for a given assistance level and propeller torque, the motor torque is preferably controlled to be:

$$T_{motor} = K_{assist} T_{pedal} \qquad 10$$

and, equivalently, $$T_{motor} = \frac{K_{assist}}{1 + K_{assist}} T_{prop} \qquad 11$$

Another way of expressing equations 8 and 9 that is particularly insightful is $$T_{prop} = [1 + K_{assist}] T_{pedal} \qquad 8b$$

$$P_{prop} = [1 + K_{assist}] P_{pedal} \qquad 9b$$

Equations 8b and 9b thus illustrate the torque and power assistance provided by the electric motor as directly controlled by the assistance factor, $K_{assist}$.

From equations 1 and 8, the motor torque command is then:

$$T_{motor}^* = \frac{K_{assist}}{1 + K_{assist}} K_0 \left( \omega_{prop\_est} - \frac{v_{boat\_est}}{K_1} \right)^2 \qquad 12$$

or, equivalently, the motor power command is controlled to be:

$$P_{motor} = K_{assist} P_{pedal} \qquad 13$$

$$P_{motor} = \frac{K_{assist}}{1 + K_{assist}} P_{prop} \qquad 14$$

The motor torque (or power) command is thus determined indirectly as a function of the pedaling effort without need for an explicit pedaling effort sensor.

Table 1 provides exemplary operating points at various levels of motor assistance for a given propeller while holding total propulsion power, propeller and pedal speeds constant, and hence, watercraft (boat) speed constant.

TABLE 1

| | Propulsion Power | | 250 | W | |
|---|---|---|---|---|---|
| | Pedal Speed | | 66.3 | RPM | |
| | Gear ratio | | 6 | | |
| | Prop Speed | | 398 | RPM | |
| | | | 41.7 | rad/sec | |
| | Prop Torque | | 6.0 | Nm | |
| | Boat Speed | | 6 | MPH | |
| Kassist | Tprop Nm | Tmotor Nm | Tpedal Nm | Pprop W | Pmotor W | Ppedal W |
| 0% | 6.0 | 0.0 | 6.0 | 250 | 0 | 250 |
| 25% | 6.0 | 1.2 | 4.8 | 250 | 50 | 200 |
| 50% | 6.0 | 2.0 | 4.0 | 250 | 83 | 167 |
| 100% | 6.0 | 3.0 | 3.0 | 250 | 125 | 125 |
| 200% | 6.0 | 4.0 | 2.0 | 250 | 167 | 83 |
| 400% | 6.0 | 4.8 | 1.2 | 250 | 200 | 50 |
| 800% | 6.0 | 5.3 | 0.7 | 250 | 222 | 28 |
| 1600% | 6.0 | 5.6 | 0.4 | 250 | 235 | 15 |

Table 1 shows that by adjusting the motor assistance level, $K_{assist}$, the operator can selectively choose the level of pedaling effort, $P_{pedal}$, desired while maintaining a constant level of total propulsion power, $P_{prop}$, and hence, watercraft speed. Alternatively, the operator can choose to maintain a desired level of pedaling effort and then vary the motor assistance level to vary or increase the watercraft speed.

The maximum assistance level is inherently set such that the commanded motor torque (or power) is always lower than the total required propeller torque (or power) at a given rotational speed. This ensures that the motor and propeller speed do not accelerate out of control; i.e., $$T_{motor} < T_{prop} \qquad 15$$

$$P_{motor} < P_{prop} \qquad 16$$

$$\frac{K_{assist}}{1 + K_{assist}} < 1 \qquad 17$$

Additional limits can be added to prevent excessive speeds in the event that the propeller is out of the water while the propulsion system is energized. For example, the acceleration rate of the electric motor shaft can be monitored by calculating the derivative of the motor rotational speed. If the acceleration rate is significantly higher than that predicted for the commanded motor torque with the propeller in the water, then the controller assumes the propeller is out of the water and quickly shuts down or limits the motor and propeller speed.

The motor torque is controlled via preferably a current-regulated power electronic converter with PWM switching. If the motor is a brushed-DC motor, then the converter is preferably either a buck or buck/boost converter, or an H-bridge converter. If the motor is a brushless DC or brushless AC motor, such as a three-phase permanent magnet motor, then the converter is preferably a 3-phase-leg voltage source inverter with field-oriented control, or its equivalent. In the case of the brushed-DC and brushless-DC motors, the motor torque is controlled by regulating the actual (or effective) armature current. For the field-oriented AC motor, the q-axis (i.e., torque component of the stator current) is regulated.

The motor speed (and hence propeller speed) is estimated from the voltage and/or frequency applied to the motor, depending upon the type of motor and torque controller. For a brushed-DC motor, the motor speed is calculated from the applied motor terminal voltage, resulting armature current, and the known parameters of the motor including the voltage constant of the motor and resistance of the armature. This method is well known in practice. For a brushless-DC or AC motor, the motor speed is determined directly from the frequency applied to the motor. Alternatively, a shaft position or speed sensor is utilized, such as an encoder, resolver, or tachometer.

Such motor torque control and speed estimation is well understood and implemented in practice. Note so-called "direct" torque control schemes not requiring current regulation are also common and are acceptable alternatives to that described above, whereby the motor torque is controlled directly through the PWM switching.

Figure 7:
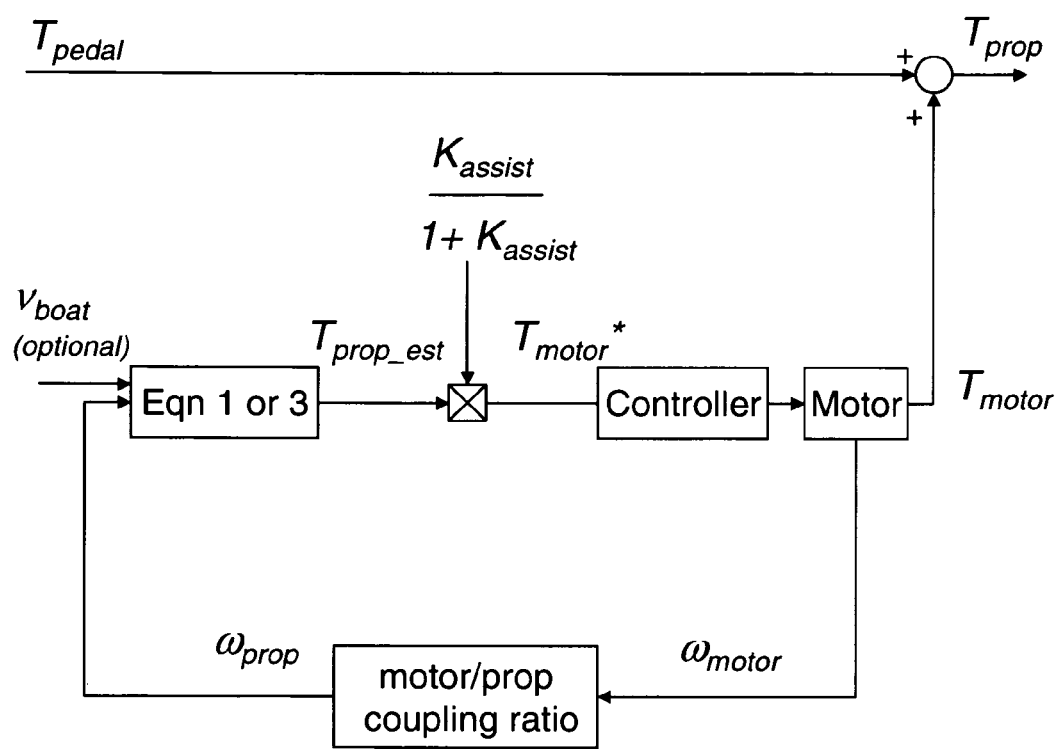
FIG. 7 illustrates the basic control block diagram for the preferred embodiment.

FIG. 7 illustrates the basic control block diagram for the preferred embodiment wherein the motor torque (or power) command is determined from an estimate of the propeller torque (power) and indirectly as a function of the pedaling effort according to equations 1, 3, and 11. Based upon the above control description, the preferred system embodiment works as follows:

1.) The operator sets the motor assistance level, $K_{assist}$.
2.) The operator exerts force on the pedals, which is converted to an effective torque, thereby causing the propulsion unit to achieve some initial propeller speed, and power.
3.) The controller estimates the propeller speed, $\omega_{prop}$, from the motor voltage or frequency, and known coupling ratio between the motor and the propeller.
4.) From the propeller speed $\omega_{prop}$ (and optionally from also the estimated or sensed boat speed) the controller estimates the propeller torque $T_{prop\_est}$, and from the $K_{assist}$ level, calculates and commands the desired motor torque, $T_{motor}*$.
5.) The controller regulates the motor current (or equivalent) to achieve the desired motor torque, $T_{motor}$.
6.) The total torque to the propeller, $T_{prop}$, increases to $T_{pedal} + T_{motor}$.
7.) The speed of the propeller (and pedal), and resulting boat speed, then either increases, and/or the operator simultaneously reduces the pedaling effort, and the propeller and pedal speed do not increase substantially, but the operator is allowed to pedal at a desired comfort level while still maintaining a high watercraft speed.

In actual practice, the control steps 1-7 outlined above occur nearly simultaneously in a continuous iterative or adaptive process such the watercraft operation is entirely smooth and pleasant to operate.

Figure 8:
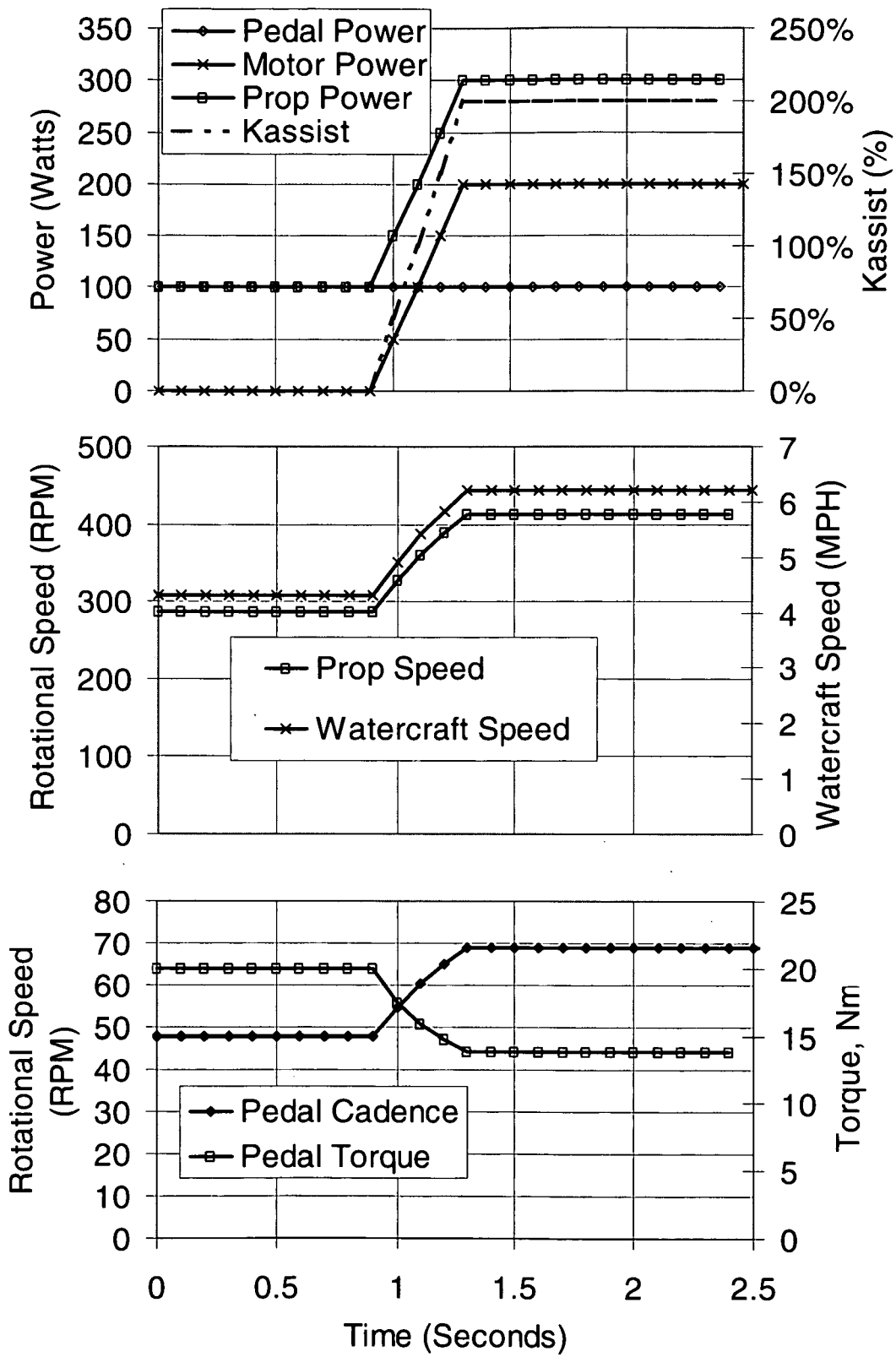
FIG. 8 illustrates exemplary operation with the operator maintaining constant pedal power while changing the motor assistance level.

FIG. 8 illustrates an exemplary operation whereby the operator chooses to maintain a constant level of pedaling power while increasing the $K_{assist}$ value from 0% to 200%. Initially the $K_{assist}$ level is 0% so that the propeller power is coming solely from the pedaling power (100 Watts). The pedaling cadence is 49 RPM and pedaling torque is 20 Nm. The resulting propeller speed is ~280 RPM (6:1 gear ratio) and the watercraft speed is ~4.5 MPH.

Around time 1 second, the operator increases the $K_{assist}$ value to 200%, while maintaining the same 100 Watts of pedaling power. The motor power increases from 0 to 200 Watts, thereby increasing the total propeller power to 300 Watts. As a result the propeller speed increases to ~420 RPM and the watercraft speed increases to ~6.2 MPH. The pedal cadence also increases to ~69 RPM, while the pedal torque decreases to ~14 Nm. The invention is thus seen to increase the achievable watercraft speed, and allow the operator to adjust the pedaling cadence/torque characteristics to a desired comfort level.

Figure 9:
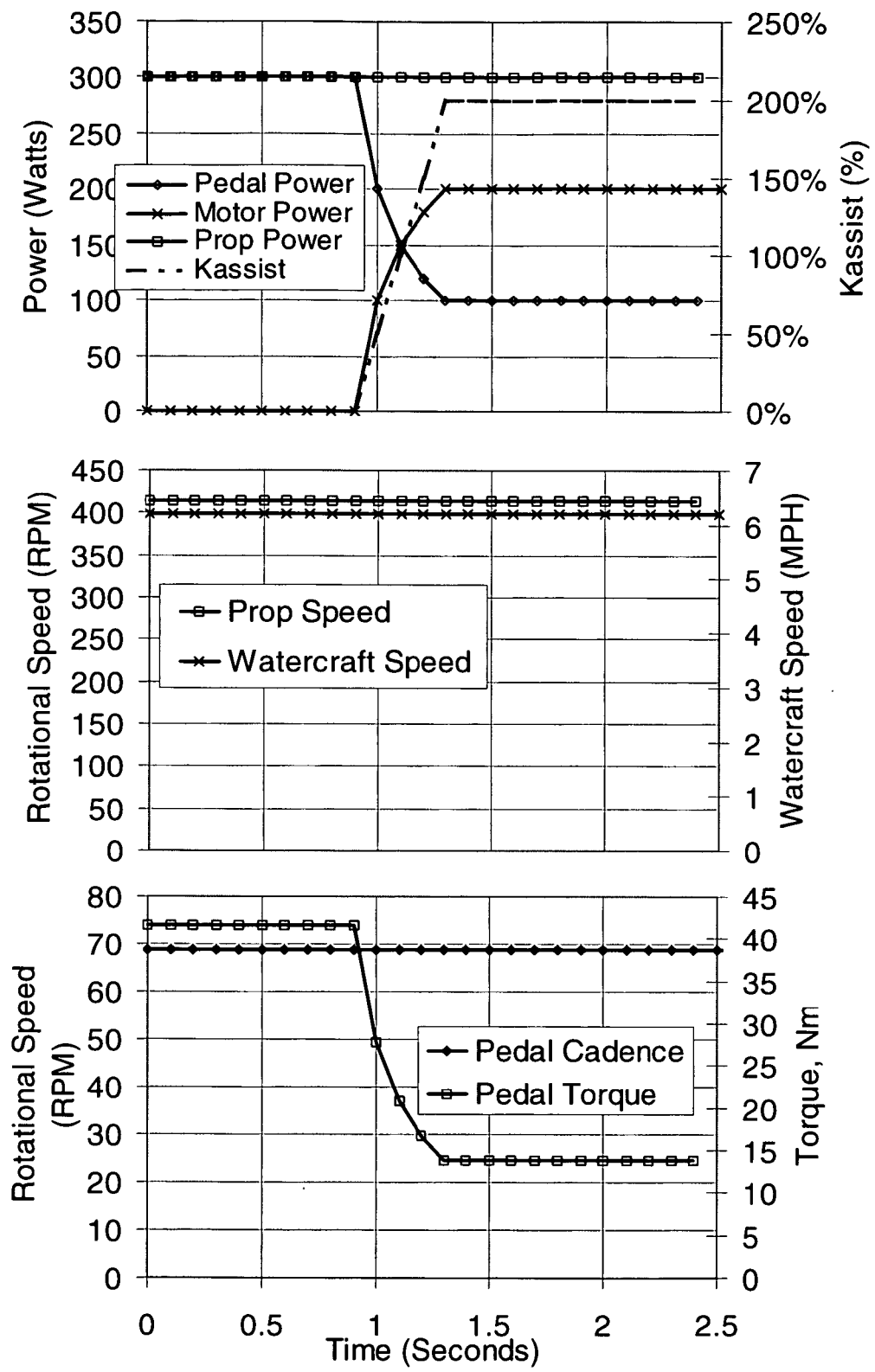
FIG. 9 illustrates exemplary operation with the operator maintaining constant pedal cadence while changing the motor assistance level.

FIG. 9 illustrates a second exemplary operation whereby the operator chooses to maintain a constant pedal cadence while increasing the $K_{assist}$ value from 0% to 200%. Initially the $K_{assist}$ level is 0%, the pedaling cadence and torque are ~69 RPM and ~42 Nm, respectively. The propeller speed is ~420 RPM, and the resulting pedal and propulsion power is 300 Watts, and the watercraft speed is ~6.2 MPH. As the operator increases the $K_{assist}$ value to 200%, while choosing to maintain the same pedal cadence of ~69 RPM, the motor power increases from 0 to 200 Watts. The propeller speed remains at ~420 RPM, so that the propeller power and watercraft speed remain the same at 300 Watts and ~6.2 MPH, respectively. The pedal power, however, reduces to 100 Watts and the pedal torque reduces to ~14 Nm. The invention is thus seen to allow the operator to adjust the pedaling effort required to a desired comfort level, while maintaining a high (or desired) watercraft speed.

Figure 10:
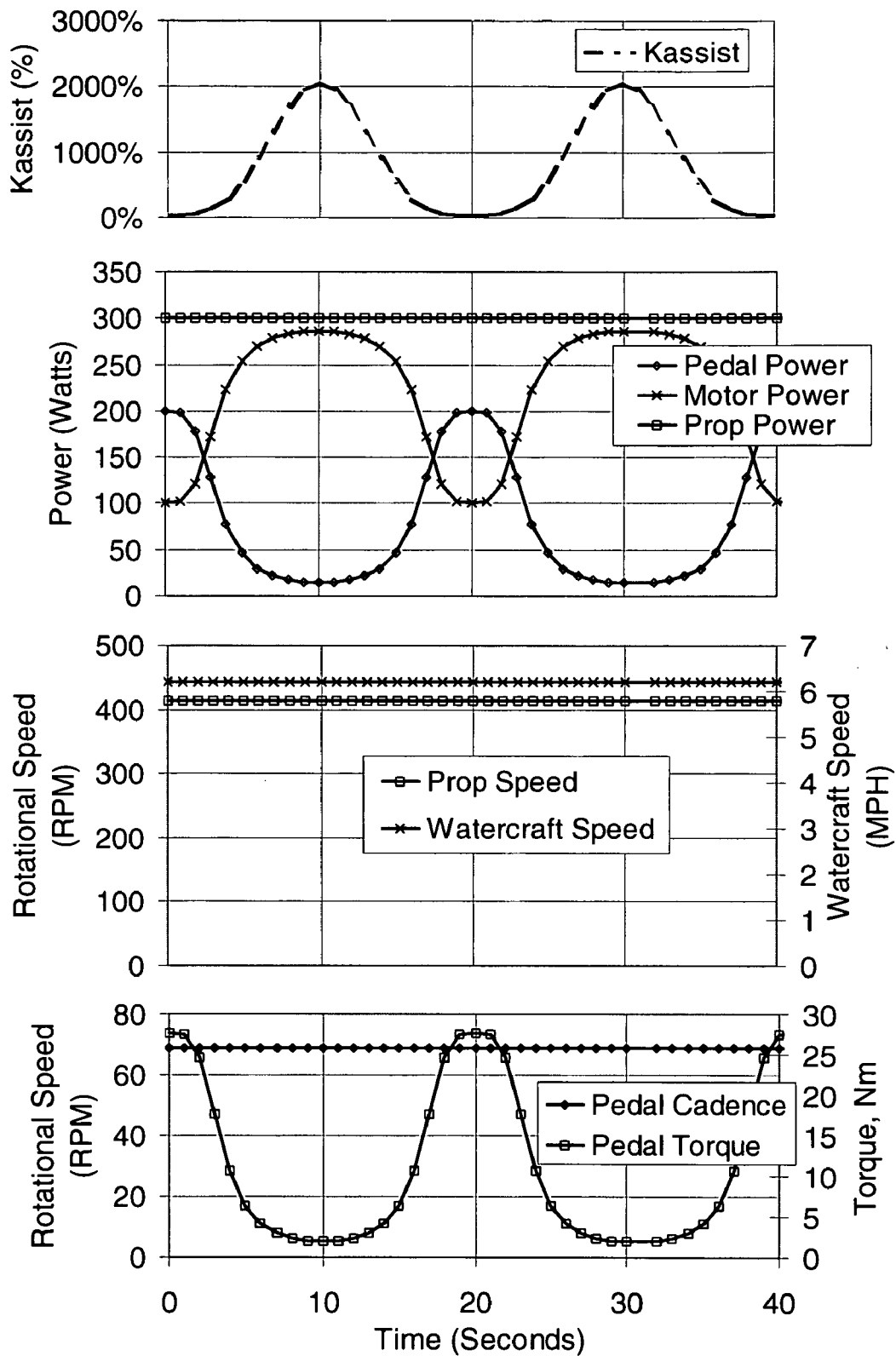
FIG. 10 illustrates exemplary operation with simulated hills and valleys.

The pedaling through rolling terrain (i.e., "hills" and "valleys"), as is common with a bicycle on land, can be simulated for the operator, by allowing the motor assistance level, $K_{assist}$, to vary in a sinusoidal (or other) manner as a function of time, distance traveled, or revolutions counted. The operator would set, for example, the amplitude and period (i.e., wavelength) of the rolling terrain. FIG. 10 illustrates such an exemplary operation with simulated hills and valleys. In this example, the assistance level, $K_{assist}$, is varied as a function of time, t, according to the function $$K_{assist} = K_{assist\_uphill} + K_{assist\_downhill}[\sin(2\pi f_{terrain}t)]^4 \quad 18$$

where $K_{assist\_uphill}$ and $K_{assist\_downhill}$ are the assistance levels simulating traveling uphill and downhill, respectively, and $f_{terrain}$ is the frequency of the hill/valley terrain profile. Increased pedaling and vehicle inertia, similar to that experienced while accelerating a bicycle from standstill or coasting from an established speed, can also be simulated by allowing the motor assistance gain, $K_{assist}$, to vary as a function of watercraft acceleration. For example, when the watercraft and/or pedaling action is accelerating, the $K_{assist}$ value can be temporarily reduced, and then gradually increased to the operator-set level in an exponential manner, as the acceleration decreases. Likewise, when the pedaling action is decelerating, the $K_{assist}$ value can be temporarily increased, and then gradually decreased to the operator-set level in an exponential manner as the deceleration ceases.

Figure 11:
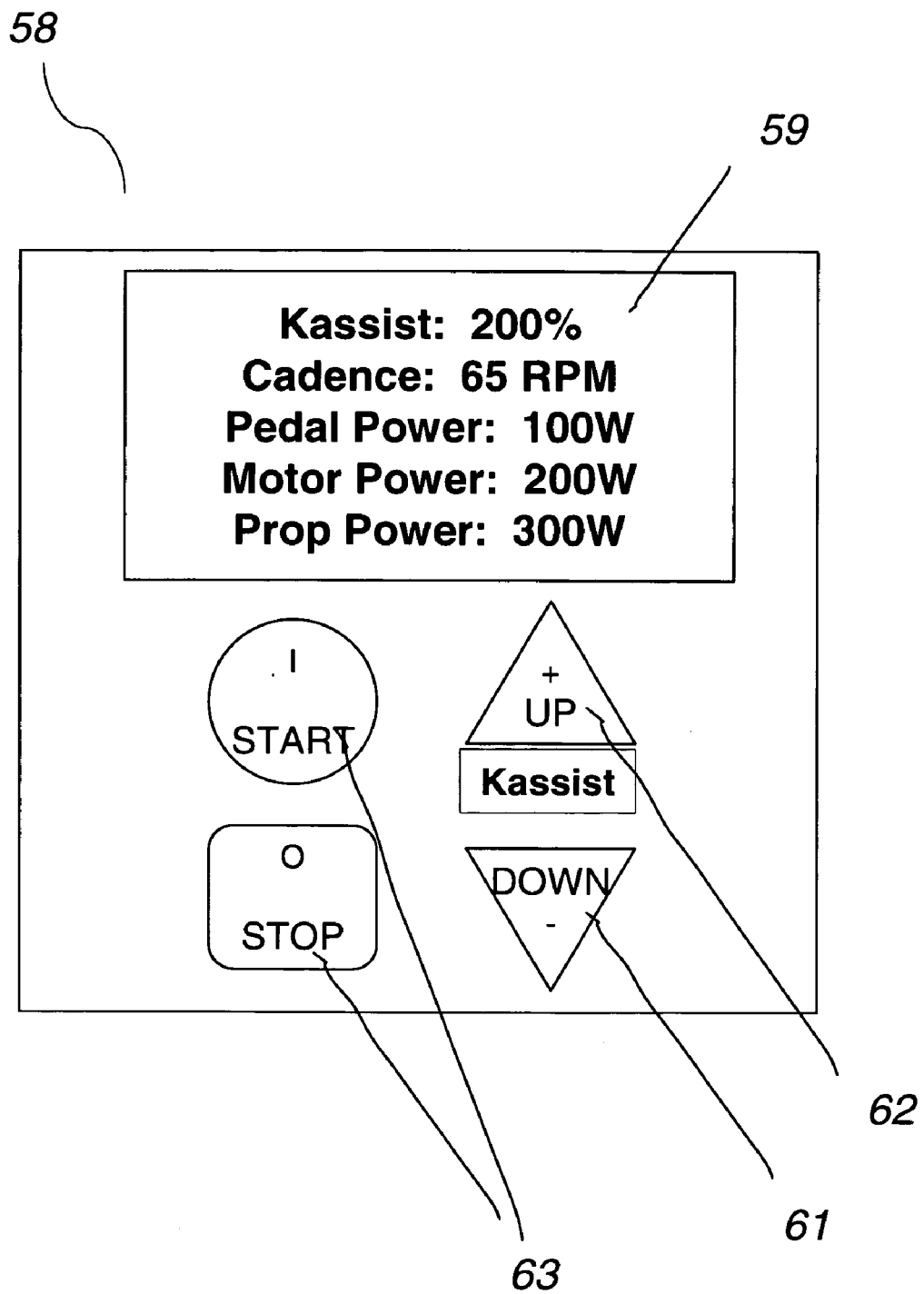
FIG. 11 illustrates the operator control and display unit.

FIG. 11 illustrates an exemplary user (operator) interface 58, consisting of START and STOP switches 63, UP 62 and DOWN 61 switches to set the $K_{assist}$ value, and a LCD character (or graphics) module 59 to display various useful information, such as the $K_{assist}$ value, pedal cadence, pedal power, motor power, and propeller power. Other information such as watercraft speed, propeller RPM, pedal torque, battery status, distance traveled, remaining distance that can be traveled at current settings, remaining travel time at current settings, etc. can also be displayed. The switches can be of a low-cost and weather resistant membrane switch type.

The display 59 may also be a touch-sensitive display incorporating the switches 61, 62, and 63 in a virtual manner. Graphics can also be added to illustrate the simulated hills and valleys.

FIG. 12 illustrates a propulsion unit 102 as an alternative embodiment of this invention. The propulsion unit 102 shares the same key features as the propulsion unit 13, but has the addition of a shaft torque sensor 60. The torque sensor 60 provides direct measurement of the pedal torque $T_{pedal}$ (i.e., referred to the propeller shaft via the crank/propeller sprocket gear ratio). The torque sensor can be of any number of commercially available or custom sensors including strain gauge and magnetostrictive devices. The motor torque command is calculated directly from the measured pedal torque and $K_{assist}$ value, according to equation 10 above; i.e., $$T_{motor}^* = K_{assist} T_{pedal\_measured} \quad 19$$

FIG. 13 illustrates the basic control block diagram for this alternative embodiment wherein the motor torque (or power) command is determined directly as a function of the pedaling effort according to equation 19.

There are at least three advantages of this embodiment. Firstly, the motor assistance is more accurately controlled, since the pedaling effort is not inferred or dependent upon knowledge of the propeller and watercraft characteristics. For example, a manufacturer or operator can change the propeller size or pitch without needing to adjust the controller settings. Secondly, a potential run-away situation cannot occur in the event that the propeller is removed from the water while the system is running. Thirdly, the propeller torque can now be calculated from the sum of the known motor and pedal torques, according to equation 8 above. Then, if the propeller characteristics are known, the actual watercraft speed can be estimated using equation 1 above; i.e., $$v_{boat\_calc} \cong K_1\left(\omega_{prop} - \sqrt{\frac{T_{prop\_calc}}{K_0}}\right) \quad 20$$

Knowledge of the watercraft speed is generally of direct value to the operator and can be displayed in user interface 58. It is also of indirect value; e.g, the watercraft speed can be used to calculate distance traveled, available distance to travel with remaining energy storage capacity, etc. Such a method is disclosed in U.S. Pat. No. 6,986,688.

In yet another embodiment, the torque sensor 60 can be placed immediately adjacent to the propeller; i.e., between the motor and propeller, such that the torque on the propeller, $T_{prop}$, is directly measured. In this case, the motor torque command is then calculated from:

$$T_{motor}^* = \frac{K_{assist}}{1 + K_{assist}} T_{prop\_measured} \quad 21$$

FIG. 14 illustrates an alternative embodiment of this invention in a watercraft 16, wherein the operator sits in a recumbent position in seat 76 while pedaling. A motor assisted propulsion unit 104, with the same key features as the propulsion units 13 or 102, or any embodiment thereof, is positioned in/on the watercraft 16 such that the operator exerts pedaling effort while sitting in a recumbent position.

The pedal mechanism can also be positioned and/or designed to be operated via the hands/arms of an operator, rather than the feet. Since a persons' hand/arm strength and endurance is typically much lower than a persons' leg strength, the motor assistance of this invention provides a person utilizing hand/arms for propulsion to significantly increase the speed and travel range of the watercycle, compared to a watercycle without this invention.

The user display unit 58 can be mounted directly onto or integral with the upper housing 11 of the propulsion unit 104. This significantly reduces the amount of electrical wiring and connectors, and thereby enables the propulsion unit 104 to be more readily removed during disassembly/assembly of the watercraft, as is often desired for road transportation of pedal-powered watercraft. It also enables a propulsion unit with exhausted batteries to be rapidly and readily exchanged with a fully charged unit. This feature is particularly beneficial for rental units in the tourist industry.

Optional photovoltaic (solar) panel 72 is mounted to the rear of the watercraft, with charging unit 74. The energy storage unit 56 can be optionally located within or on the watercraft hull or frame structure.

FIG. 15 illustrates yet another embodiment of this invention in a watercraft 17 based on U.S. Pat. No. 5,088,944, wherein the propeller shaft 42 extends from the propeller 21 to at least near a crank mechanism 81. Electric motor 34 is mounted integral with the propeller shaft 42 without couplings (as illustrated with shared motor and propeller shafts) or alternatively via couplings. Alternatively, the motor 34 and propeller shaft 42 can be linked via gears, sprockets/chains, belts/pulleys, etc.

The watercraft 17 and 16 are illustrated to be catamarans, but the invention is equally applicable to single and tri-hulled watercraft. In such watercraft, the propeller shaft may be lengthy and extend through the hull at the watercraft stern. In this case, the motor 34 can be mounted to the propeller shaft in a similar manner as illustrated in FIG. 13. A two person watercraft could have two independent propulsion units.

By providing electric motor assistance, the invention enables a propeller of larger diameter and/or increased pitch and/or higher rotation speed to be used compared to a solely pedal-powered watercraft.

To reverse the watercraft, the operator preferably reverses the direction of the pedaling effort. The system control electronics unit 62 detects that the motor rotation has reversed (or that the torque signal from optional torque sensor 60 has reversed), and then sends a negative torque command to the propulsion control electronics unit 64, thereby causing the electric motor torque to reverse also.

Prior to the start of normal operation, the energy storage unit 56 is preferably to be charged to its full capacity. During normal operation with $K_{assist}$ values above 0%, the energy stored in the energy storage unit 56 will be continuously depleted at a rate dependent upon the $K_{assist}$ value chosen by the operator and by the pedaling effort put forth. The system control electronics unit 62 will preferably continue to monitor the charge state of the energy storage unit 56, and notify the operator of the charge state via the user interface 58 display 59.

In embodiments whereby a photovoltaic charge unit 70 is not included with the watercraft, when the charge in the energy storage unit 56 is depleted, or below some predetermined lower threshold, the system control electronics unit 62 will preferably set the $K_{assist}$ value to zero and command zero motor torque to not further deplete the battery-based energy storage unit to avoid permanent damage. The operator will then be responsible for propelling the watercraft solely from pedaling.

In embodiments whereby a photovoltaic charge unit 70 is mounted on the watercraft, when the charge in the energy storage unit 56 is depleted, or below some predetermined lower threshold, the system control electronics unit 62 will preferably continuously and automatically adjust the maximum $K_{assist}$ value such that all power transferred to the electric motor is originating from the photovoltaic charge unit 70, and therefore not further depleting the energy storage unit 56 to a point of irreparable damage.

A significant advantage of this invention, relative to other electric pedal watercraft (e.g., U.S. Pat. No. 6,855,016), is that in the event of a motor or controller failure, the operator will still be able to propel the watercraft via pedaling since the propeller is mechanically coupled to the operators pedal mechanism.

Numerous quantities can be calculated and displayed to the operator for informational purposes, which are especially of interest when using the watercraft for exercise purposes. The quantities and corresponding calculations include:

$$T_{pedal} = \frac{1}{1 + K_{assist}} T_{prop} \qquad 22$$

The actual torque at the pedal mechanism experienced by the operator is calculated as $$T_{pedal\_actual} = GR * T_{pedal} \qquad 23$$

where GR is the "gear ratio" between the pedal mechanism and the propeller.

The pedaling effort power is $$P_{pedal} = \omega_{pedal} T_{pedal} \qquad 24$$

where $\omega_{pedal}$ is the referred rotational velocity of the pedal mechanism.

$$P_{pedal} = \frac{1}{1 + K_{assist}} P_{prop} \qquad 25$$

From the pedaling effort power summed (i.e., integrated) over time, the calories burned by the operator can be determined. Similarly, from the motor power summed over time, the stored energy used can be determined.

Alternative embodiments for the assistance factor can also be implemented; e.g., $$K_{assist} \equiv \frac{P_{motor}}{P_{prop}} \qquad 26$$

or $$K_{assist} \equiv \frac{T_{motor}}{T_{prop}} \qquad 27$$

in which case, the required or commanded motor power is $$P_{motor} = K_{assist} P_{prop} \qquad 28$$

and the resulting pedal power is $$P_{motor} = P_{prop} - P_{motor} = (100\% - K_{assist}) P_{prop} \qquad 29$$

In this case, the maximum value for $K_{assist}$=100%, as per the Table 2 below.

TABLE 2

| Kassist | Pprop W | Pmotor W | Ppedal W |
|---------|---------|----------|----------|
| 0%      | 250     | 0        | 250      |
| 20%     | 250     | 50       | 200      |
| 40%     | 250     | 100      | 150      |
| 60%     | 250     | 150      | 100      |
| 80%     | 250     | 200      | 50       |
| 100%    | 250     | 250      | 0        |

In an alternative embodiment, a torque sensor is added to the shaft between the pedal system and the electric motor.

It should be further understood that the invention can be embodied with virtually any type of watercraft hull design and construction, including planing hulls and monohulls, and even hulls with hydrofoils.

The propeller 21 should be interpreted as any mechanism designed to produce propelling thrust for a watercraft including paddle wheels, rowing mechanisms, and moving fin mechanisms.

What is claimed is:

1. An electric motor assisted marine propulsion system for a watercraft, comprising:
   a manually-driven power input mechanism configured to accept human effort;
   a propulsion mechanism comprising at least one propeller mounted on a propeller shaft for providing a propulsive thrust in water;
   a mechanical drive train extending between the manually-driven power input mechanism and the propeller shaft, the mechanical drive train configured to transmit the human effort to the propeller shaft to rotate the propeller;
   at least one electric motor mechanically coupled to the propeller shaft, wherein the electric motor is arranged to provide assisting power to the propeller shaft to drive the propeller;
   an energy storage device configured to supply electrical power to the electric motor;
   a control mechanism configured to control electrical power supplied to the electric motor as a function of the human effort, wherein a ratio of assisting power supplied by the electric motor and the human effort is variably and selectively adjustable by an operator; and
   a housing enclosing the mechanical drive train, the electric motor and at least a substantial portion of the propeller shaft.

2. The propulsion system of claim 1 further comprising an operator interface enabling the operator to adjust the level of the assisting power supplied by the electric motor.

3. The propulsion system of claim 2 wherein the operator interface is mounted on or is integral with the housing of the propulsion system.

4. The propulsion system of claim 1 wherein the control mechanism comprises of an electronics unit mounted within the housing of the propulsion system.

5. The propulsion system of claim 4 wherein the electronics unit is configured to provide good thermal conduction from power switching devices to the surrounding water.

6. The propulsion system of claim 1 wherein the energy storage device is mounted within the housing of the propulsion system.

7. The propulsion system of claim 1 wherein the assisting power from the electric motor can be modulated to simulate travel through hills and valleys.

8. The propulsion system of claim 1 wherein the electric motor is controlled as a function of propeller speed.

9. The propulsion system of claim 1 wherein the electric motor is controlled as a function of a torque sensor signal.

10. The propulsion system of claim 1 wherein the electric motor is integrally mounted with the propeller shaft.

11. The propulsion system of claim 1 further comprising an operator interface enabling the operator to monitor performance parameters and operating information.

12. The propulsion system of claim 1 wherein the manually-driven power input mechanism comprises rotatable pedals.

13. The propulsion system of claim 12 wherein a reverse rotation of the pedals causes the propulsion mechanism to generate reversed thrust.

14. The propulsion system of claim 1 wherein the assisting power from the electric motor is modulated to simulate inertial effects.

15. A watercraft comprising the propulsion system of claim 1.

16. The watercraft of claim 15 further comprising a photovoltaic system for powering the electric motor.

* * * * *